United States Patent Office 3,431,497
Patented Mar. 4, 1969

3,431,497
DISCONTINUOUS FORWARD AUTOMATIC
GAIN CONTROL
Harold J. Manley, Sudbury, Mass., assignor to the United
States of America as represented by the Secretary of
the Air Force
Filed Sept. 10, 1964, Ser. No. 395,624
U.S. Cl. 325—326
Int. Cl. H04b 1/16; H03k 5/20
9 Claims This invention relates to a system that creates a new mode of selectivity in a multifrequency pulse receiver. More particularly it relates to an electronic system which acts to prevent the recognition of signal pairs by a multifrequency pulse receiver if the ratio of the power levels of the two component signals of the signal pair falls outside specified limits.

Since the system herein disclosed is an improvement to a multifrequency pulse receiver, the multifrequency pulse receiver must be examined somewhat in detail in order to set forth the cooperative action of the discontinuous forward automatic gain control system. The multifrequency pulse receiver techniques of frequency selection are known in the art and are not a part of this invention.

It is an object of this invention to provide a new system of selectivity in a multifrequency pulse receiver.

Another object of this invention is to provide a selectivity system in a multifrequency pulse receiver that will select pulse pairs having a specific range of ratios of pulse amplitudes and reject other signals.

Another object of the present invention is to provide a signal pair recognition system based on the quotient relationship of the amplitudes of the said signal pair.

Another object of the present invention is to provide an automatic gain controlling system that controls the system gain applied to the product of the amplitudes of a signal pair in accord with the summation of their individual signal amplitudes.

Another object of the present invention is to provide a system that will select signal pairs based on the requirements of specific ranges of signal products with respect to signal quotients.

In general, this system accomplishes the new selectivity parameter by requiring for a signal pair to be recognized that the product of the two signals exceed a threshold value that is determined by the magnitude of the summation of the individual signals.

For a better understanding of this invention and the apprehending of additional objects and the advantages encompassed, reference is made to the accompanying description and drawings in which:

FIG. 6 is a block diagram showing an embodiment of subject invention with signal level division by attenuation.

Figure 1:
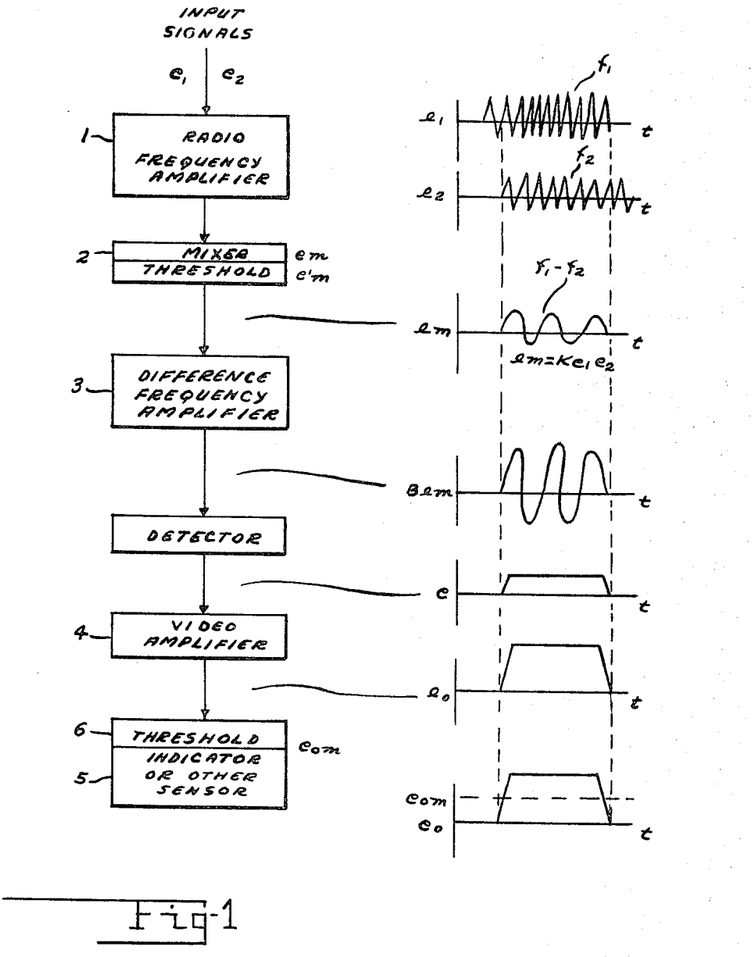
FIG. 1 is a block diagram of a conventional multifrequency pulse receiver.

Referring to FIG. 1 which is a block diagram of a conventional multifrequency pulse receiver, the two radio frequency pulses $f_1$ and $f_2$, overlapping in time of occurrence and having amplitudes $e_1$ and $e_2$, are fed from an antenna or other collection source through the radio frequency amplifier 1 to the mixer 2. It is to be understood that in this and the following instances, that if the radio frequency signals are of sufficient strength, the radio frequency amplifier may not be necessary. The mixer stage 2 generates an output pulse equal in duration to the time that two or more pulses are simultaneously present at the mixer input and the frequency of the generated pulse will be the difference in frequency between input pairs. Additional generated signals of sum and difference frequencies and the detected signal frequencies will be present at the output of the mixer stage in various magnitudes. These output signals (other than the difference frequency) are sometimes referred to as spurious signals since the difference frequency is generally the desired frequency. These spurious frequencies are attenuated in the circuitry to the extent that the desired difference frequency strongly predominates. This difference frequency pulse is amplified, rectified (detected) then the rectified pulse is amplified and used to indicate the presence of the input pulses. The amplitude of the difference frequency pulse signal at the output of the mixer is proportional to the product of the amplitudes of the input pulses which mathematically may be written $$e_m = k(e_1 e_2)$$

where:

$e_m$ is the mixer output pulse amplitude;
$e_1$ is the amplitude of one radio frequency input pulse;
$e_2$ is the amplitude of the other radio frequency input pulse;
$k$ is a constant of proportionality which is determined by the receiver configuration.

In general $e_m$, the signal output from the mixer, will be usable only if it exceeds a certain inherent threshold value denoted by $e'_m$; thus $$e'_m = k(e_1 e_2) \text{ min.}$$

The $(e_1 e_2)$ min. refers to the minimum $e_1 e_2$ product necessary to produce the mixer output signal $e'_m$.

It is seen that if $e_1$ is very large, then $e_2$ may be very small and the product $(e_1 e_2)$ can still be sufficient to yeld $(e_1 e_2)$ minimum. Thus, there is no restriction on the ratio $e_1/e_2$. This invention sets forth the electronic circuitry that provides a discontinuous forward automatic gain control that places restrictive limits on the signal ratio $e_1/e_2$.

The signal $e_m$ (assuming that it is above the threshold $e_m'$) at the mixer output is further amplified by the amplification of the difference frequency amplifier 3, and, after detection, amplified by the video amplifier 4. The combined amplification of these amplifiers may be represented by the factor A. Thus, the output voltage of video amplifier 4 may be represented $$e_o = A e_m$$

by substitution $$e_o = A k(e_1 e_2)$$

To produce an indication, signal pair indicator 5 has a threshold level 6 that has to be exceeded by the signal level of the amplified signal of the product of the signal pair. If this threshold level is denoted as $e_{om}$, then $Ak(e_1e_2)$ must equal or exceed $e_{om}$ in order for the indicator 5 to signify the presence of a signal pair. Mathematically this can be expressed, $$Ak(e_1e_2) \geq e_{om}$$

This equation can be solved for $e_1e_2$ and gives $$e_1e_2 \geq e_{om}/Ak$$

Figure 2:
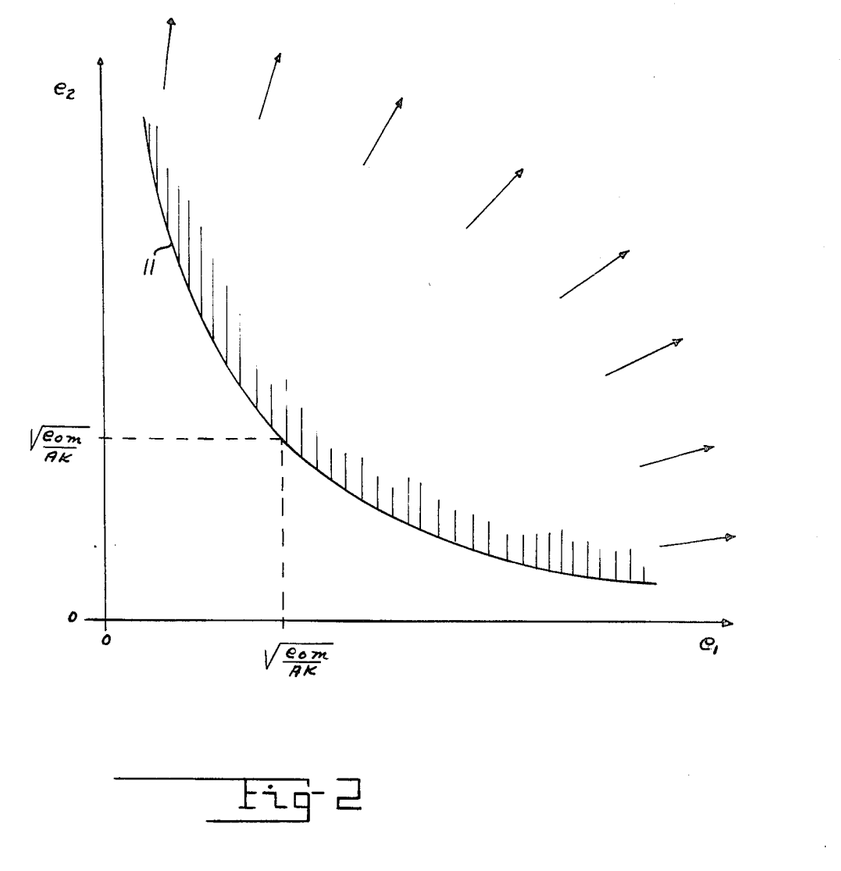
FIG. 2 is a mathematical plot showing the response characteristics of a conventional multifrequency pulse receiver.

This relationship is shown in graphical form in FIG. 2. The curve 11 is a hyperbola and each point above and to the right of the curve corresponds to a pair of values $(e_1, e_2)$ which satisfy the foregoing equation.

This invention discloses how to achieve a new parameter of selectivity by further restricting the acceptable pairs of $e_1$ and $e_2$ by restricting the ratios of $e_2/e_1$ and $e_1/e_2$ such that the magnitude of the ratios (i.e., ratios taken in either order) can not exceed a certain value M. Expressed mathematically, when $e_2$ is the larger of the signals $$e_2/e_1 \leq M$$

and when $e_1$ is the larger of the two signals $$e_1/e_2 \leq M$$

for the signal to be acceptable. Note that this latter equation is a ratio of the signals of a different signal pair than in the next preceding equation.

Figure 3:
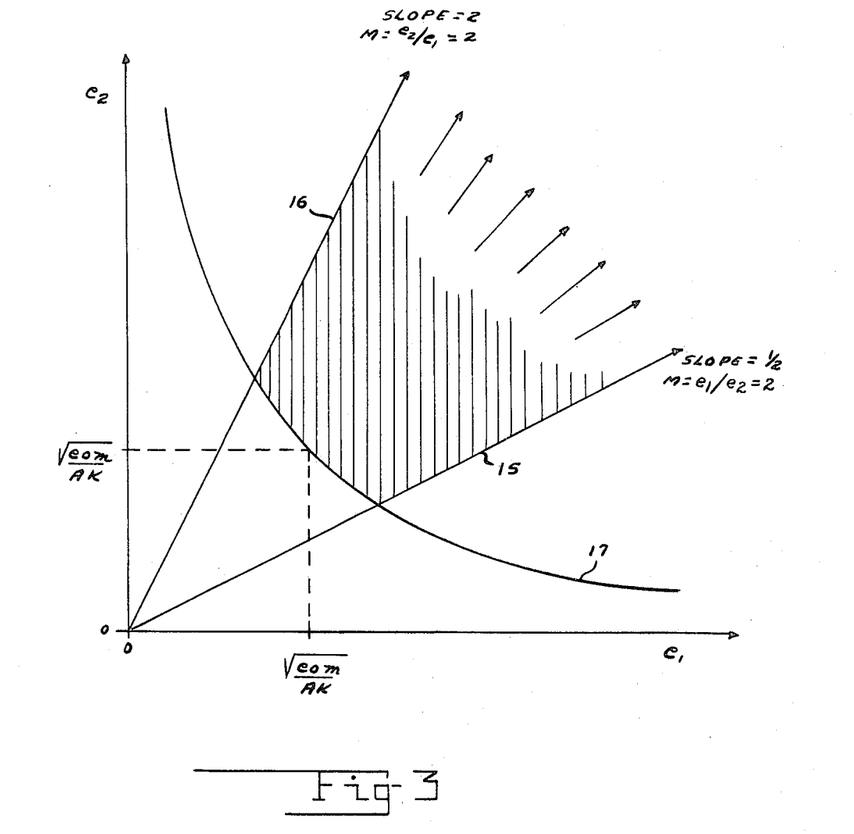
FIG. 3 is a mathematical plot showing the idealized response characteristics of a system incorporating the subject invention having, as an illustration, a signal pair ratio between 1 to 2 and 2 to 1.

FIG. 3 shows these relationships plotted on the same hyperbola as in FIG. 2 for a limiting signal ratio magnitude M equal to two. (The value of two for M is illustrative only). Any point represented by coordinates $e_1$ and $e_2$ lying between the two straight lines 15 and 16 and to the right of hyperbola line 17 corresponds to a pair of signals that satisfy all three equations:

$$e_1e_2 \geq e_{om}/Ak$$
$$e_2/e_1 \leq M$$
$$e_1/e_2 \leq M$$

The discontinuous feed forward automatic gain control will restrict the receiver so that it will only produce output indications on signals that lie approximately in the shaded area of FIG. 3. (Again, the particular numerical value shown of M is not to be considered limiting. Only for illustrative purposes the value of two is used.)

Figure 4:
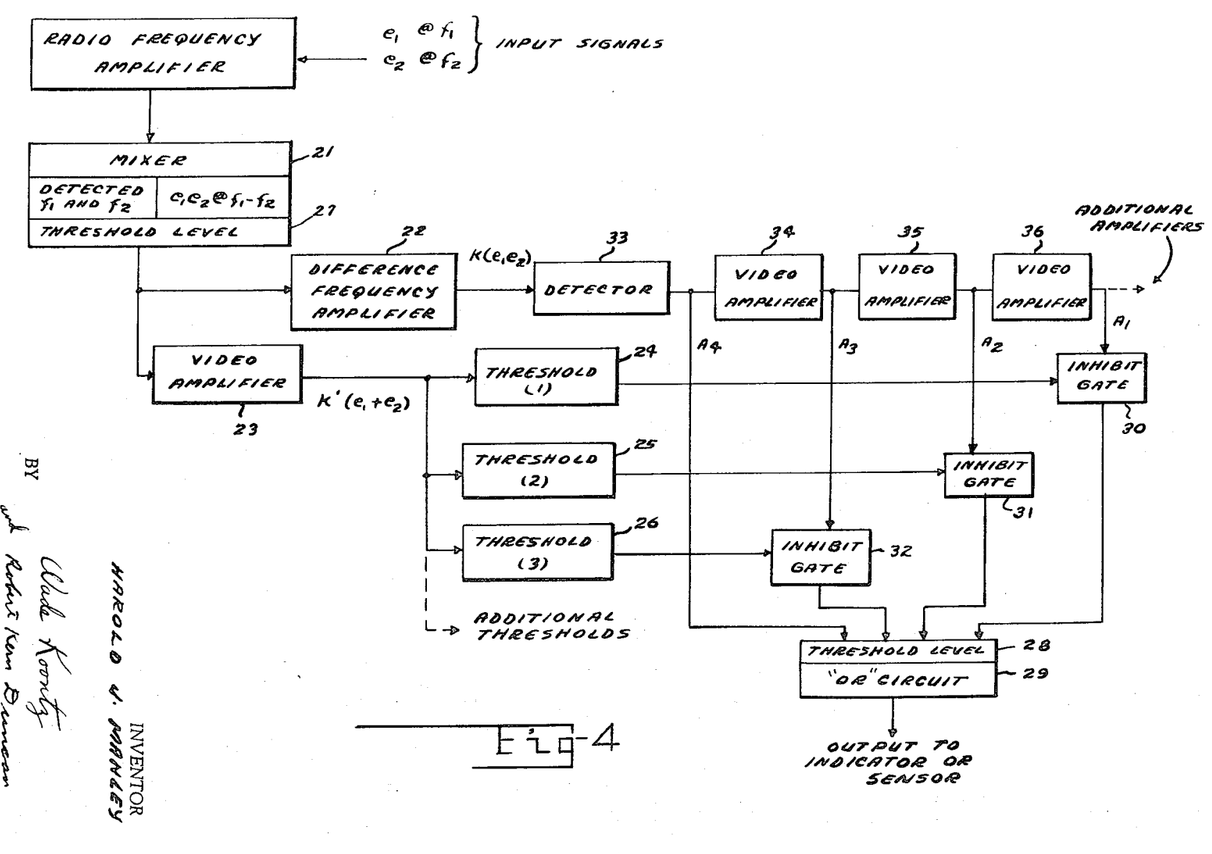
FIG. 4 is a block diagram showing an embodiment of subject invention.
Figure 11:
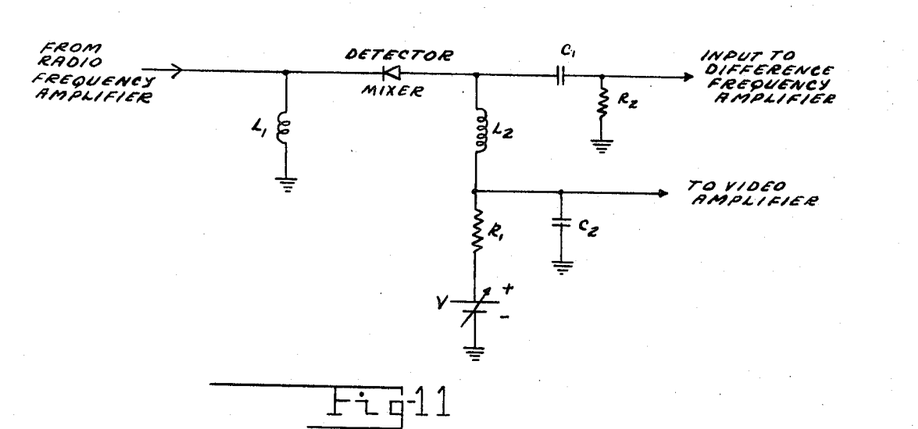
FIG. 11 is a schematic diagram of an illustrative mixer and detector circuit.
Figure 12:
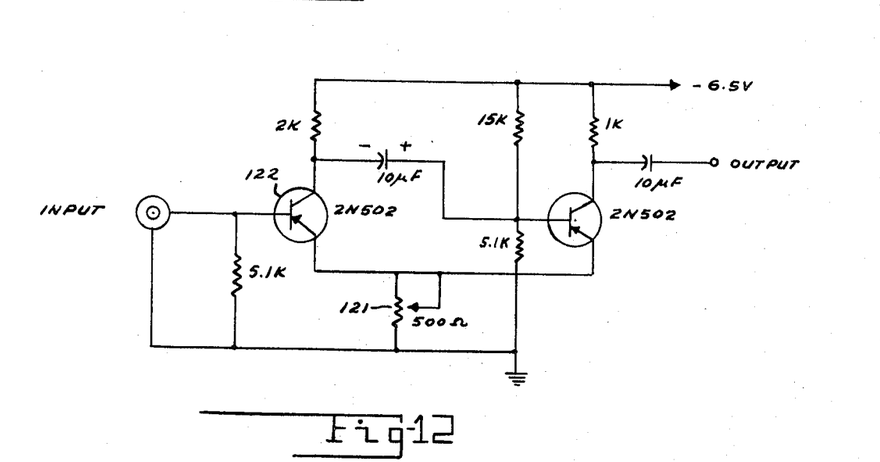
FIG. 12 is a schematic diagram of an illustrative threshold circuit.

FIG. 4 shows an embodiment of the invention cooperating with a conventional multifrequency pulse receiver as was shown in FIG. 1. The conventional mixer 21 produces a video envelope output of the detected signals of $f_1$ and $f_2$ as well as the difference output as previously mentioned. If it is inconvenient to obtain, from a particular receiver, the detected signals of $f_1$ and $f_2$ at the output of the mixer stage these signals may readily be obtained by using a conventional detector compatible with the pulse frequencies being used; this detector being in addition to the mixer producing the difference frequency output. The techniques of detection are well known and may readily be applied to a conventional multifrequency pulse receiver to obtain the envelopes of the carrier frequencies. The mixer stage used with an operating embodiment of this invention is shown in FIG. 11. It is shown for illustration. The invention is not to be limited thereby. By way of further illustrative detail; $L_1$ is a D.C. return path for the bias current supply V, and is a high impedance to the radio frequency output signal; $L_2$ and $C_2$ form a low pass filter to allow only the video pulses to go to the input of the video amplifier; $L_2$, $C_1$ and $R_2$ form a high pass filter to allow only the high frequency difference frequency pulses to go to the input of the difference frequency amplifier. Video amplifier 23 amplifies the detected and summed (during coincidence) pulse signals of $f_1$ and $f_2$ and provides a signal output proportional to the sum of $e_1$ and $e_2$. This amplified summation signal is used to trigger the various threshold circuits 24, 25 and 26. These threshold circuits may be any conventional threshold type circuit that will provide a voltage output whenever the input signal exceeds a certain value. Circuits of the Schmitt trigger type with voltage divider inputs may be used for the threshold circuits, or a Schmitt trigger circuit as illustrated in FIG. 12 may be used, where the first transistor 122 is normally cut off with the second transistor normally conducting heavily. A negative input pulse turns on the first transistor and shuts off the second transistor, giving a negative 6 volt output pulse. The firing threshold can be adjusted between 0.2 volt and 0.6 volt with the 500 ohm emitter potentiometer 121. During conduction of the first transistor, the input impedance is about 500 ohms; the Schmitt output impedance is approximately 1000 ohms; the output rise time is 0.05 microsecond. Again it is to be emphasized that this invention is not to be limited to this particular circuit. It is set forth merely as an aid in following these teachings. Other types of threshold circuits may be employed by those skilled in the art without departing from the scope of this invention as is later set forth in the claims.

In FIG. 4 only three threshold levels of automatic gain threshold selector controls are shown explicitly, but any number can be used. The greater the number of channels employed, the more accurately the maximum ratio between the input signals will be controlled and the closer the sensitive signal area of the receiver will conform to the shaded area in FIG. 3.

Figure 5:
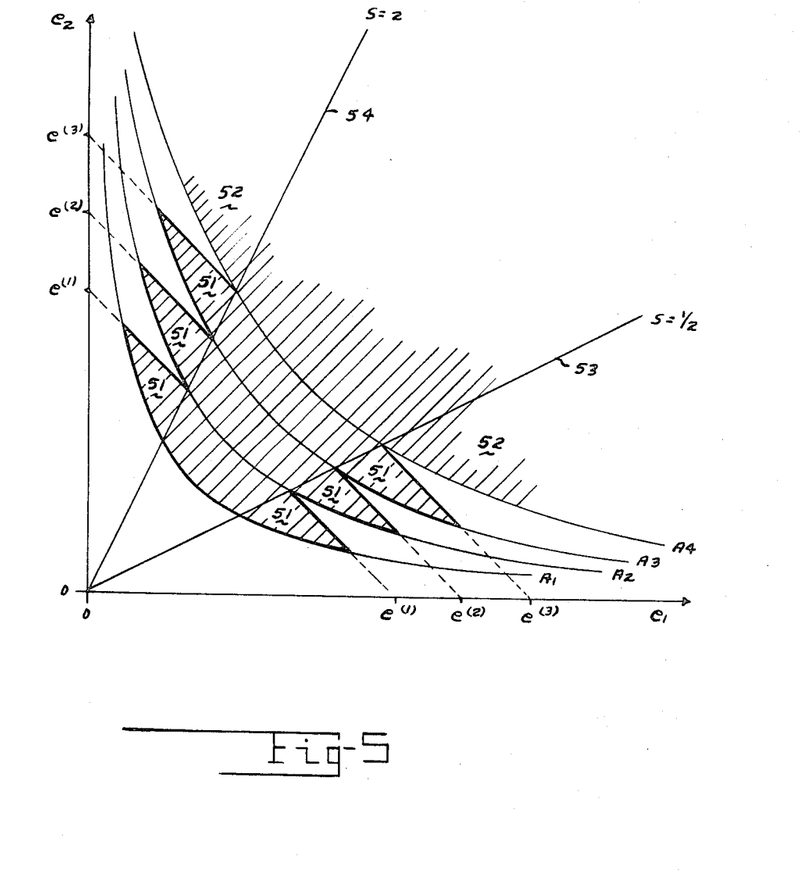
FIG. 5 is a mathematical plot showing a set of curves of the response characteristics of a simplified system of the subject invention.

The operation of the invention may best be understood by considering the illustrated simplified version having four levels of signal product and three levels of threshold gain as shown in FIGS. 4 and 5. Input signals of $e_1$ at frequency $f_1$ and $e_2$ at frequency $f_2$ will at first be assumed to be relatively small, weak signals. It will also be assumed that the separation in frequency $f_1$ and $f_2$ is such as to be receptable by the multi-frequency pulse receiver and that while the signals are weak the operational threshold 27 of the mixer 21 is exceeded so that usable signals are available at the output of the mixer. Threshold level circuit 28 establishes a minimum value of level that the product signal must have in order to be passed through the OR circuit 29 to an indicator or other utilization device. This threshold action (28) to the amplitude of the signal product creates the hyperbolic response characteristics shown in the family of curves of FIG. 5. Since the assumed signal was considered to be barely strong enough to be usable by the receiver, none of the gain control selection threshold level circuits 24, 25 or 26 are activated, and all the inhibit gate circuits 30, 31 and 32 are open (i.e., conducting), but the only signal channel effectively in operation is the most sensitive one, that is, the one with the most amplification progressing through gate 30. The signal product $(e_1e_2)$ after detection by detector 33 is amplified by the three video amplifiers 34, 35 and 36. Threshold level 28 established the hyperbola $A_1$ of FIG. 5. The product of $(e_1e_2)$ after amplification by cascade amplifiers 34, 35 and 36 must exceed this hyperbolic threshold characteristic $(A_1)$ in order to be recognized by the system as a desirable signal to be passed to the utilization equipment. This means that the product signal must be to the right of and above curve $A_1$ in FIG. 5. A lower level of this weak product signal (i.e. less amplified), will be feeding through gate circuit 31 from amplifier 35, but it will be below the threshold 28 so will be unable to produce an output. Likewise the signals from amplifier 34 and detector 33 will be below the threshold level set in threshold level circuit 28. Now, if either of the input signals, or their sum, becomes strong enough to exceed the first automatic gain control threshold selector 24 which occurs graphically at $e^{(1)}$ of FIG. 5, then the highest gain channel is blocked or inhibited by gate 30 (FIG. 4) so that no signal in this channel can be passed to the OR circuit 29 with its threshold level 28. Thus the next to the highest gain channel becomes the operative channel, and the product level of ($e_1e_2$) must lie above hyperbola $A_2$ (FIG. 5) to be recognized. If, or when, the signal levels of $e_1$ and $e_2$ becomes large enough to exceed the trigger level of the second threshold 25 (the sum of the input signals then being greater than $e^{(2)}$, FIG. 5) then the two highest gain channels are inhibited so that the third channel through amplifier 34 and gate 32 is the operative channel and the signal product must be above curve $A_3$ (FIG. 5). This discontinuous forward automatic gain controlling process continues through as many different gain channels as it is desired to provide in a given receiver.

Referring further to FIG. 5, and reiterating slightly for better understanding; if $e_1$ and $e_2$ and the sum $e_1+e_2$ all are less than the first threshold $e^{(1)}$, the gain in use would be the highest gain, $A_1$, and the receiver would be sensitive to all signal combinations to the right of hyperbola $A_1$ up to the point where either $e_1$ or $e_2$, or the sum of the two, exceeds the first threshold $e^{(1)}$. If either $e_1$ or $e_2$, or the sum thereof, exceeds $e^{(1)}$ but is less than $e^{(2)}$, the gain drops to the next lower value $A_2$, so that the receiver can not respond to the combinations of signals between the curves $A_1$ and $A_2$. This process continues as the signals increase in the following manner. If either $e_1$ or $e_2$ or the sum thereof exceeds $e^{(2)}$ but is less than $e^{(3)}$, the gain is $A_3$. Likewise, if either $e_1$ or $e_2$, or their sum, exceeds $e^{(3)}$, the gain is $A_4$. Since there are four gains used ($A_1$, $A_2$, $A_3$, and $A_4$) on this illustrative receiver, the gain will remain $A_4$ no matter how large (or small) either of the signals $e_1$ and $e_2$ become so long as the combination exceeds $e^{(3)}$. It is seen that the sensitive shaded area of FIG. 5 is the same as that for FIG. 3 except for the small additional areas of sensitivity 51 that are roughly triangular in shape and the larger areas 52 above the last gain step $A_4$.

Beyond the last threshold ($e^{(3)}$ in this illustrative case) the gain remains constant so that the shaded area of acceptable signals spreads out, 52, along the last hyperbola corresponding to $A_4$ so that for these signals the area of acceptability departed from the desired shape. This means that enough successive gain steps must be provided so that after the last step (at $e^{(3)}$ in the illustrated embodiment) the signal received must be so large in amplitude that the probability that any signals of such magnitude would occur is extremely remote.

It is apparent that as the number of discrete gain stages and the number of threshold stages are increased between the weakest signals that the receiver is receptive to and the maximum strength signals of probable encounter, the smaller the triangular shaped areas 51 become and the more nearly the reception characteristics of FIG. 5 approach those of FIG. 3. It is also apparent from the mathematical relationships and the characteristics of FIGS. 3 and 5 that the slopes of the lines delineating the maximum signal ratios, 15, 16 and 53, 54 must be reciprocals one of the other. This makes the shaded area of signal pair recognition symmetrical about a 45 degree line representing the line of equal signal amplitudes. It is also apparent that each sum signal triggering threshold must be set such that the product signal level will always be above or equal to the next hyperbolic threshold before activating the associated inhibit gate circuit. Otherwise void areas in the response characteristic would occur. The proper design values may be arrived at by plotting the curves or by mathematical calculation.

FIG. 6 is a block diagram of another embodiment of subject invention. In this embodiment the hyperbolic gain thresholds are established by attenuating downward in level from a high gain situation instead of the hyperbolic thresholds being built up by successive stages of amplification. In this embodiment difference frequency amplifier 60 (FIG. 6) would generally be a higher gain device than the difference frequency amplifier 22 of FIG. 4.

In order to complete the teaching of this invention two additional embodiments will be set forth in detail. Approximate, illustrative values of operating parameters will be used and the operational characteristic curves will be matched to their representative circuits. This detail is solely by way of explanation and all the numerical values including those values of gains, thresholds, stages, signal levels, triggering potentials and other operating potentials are relative to this particular illustrative embodiment and are not to be considered as limiting the invention.

Figure 7:
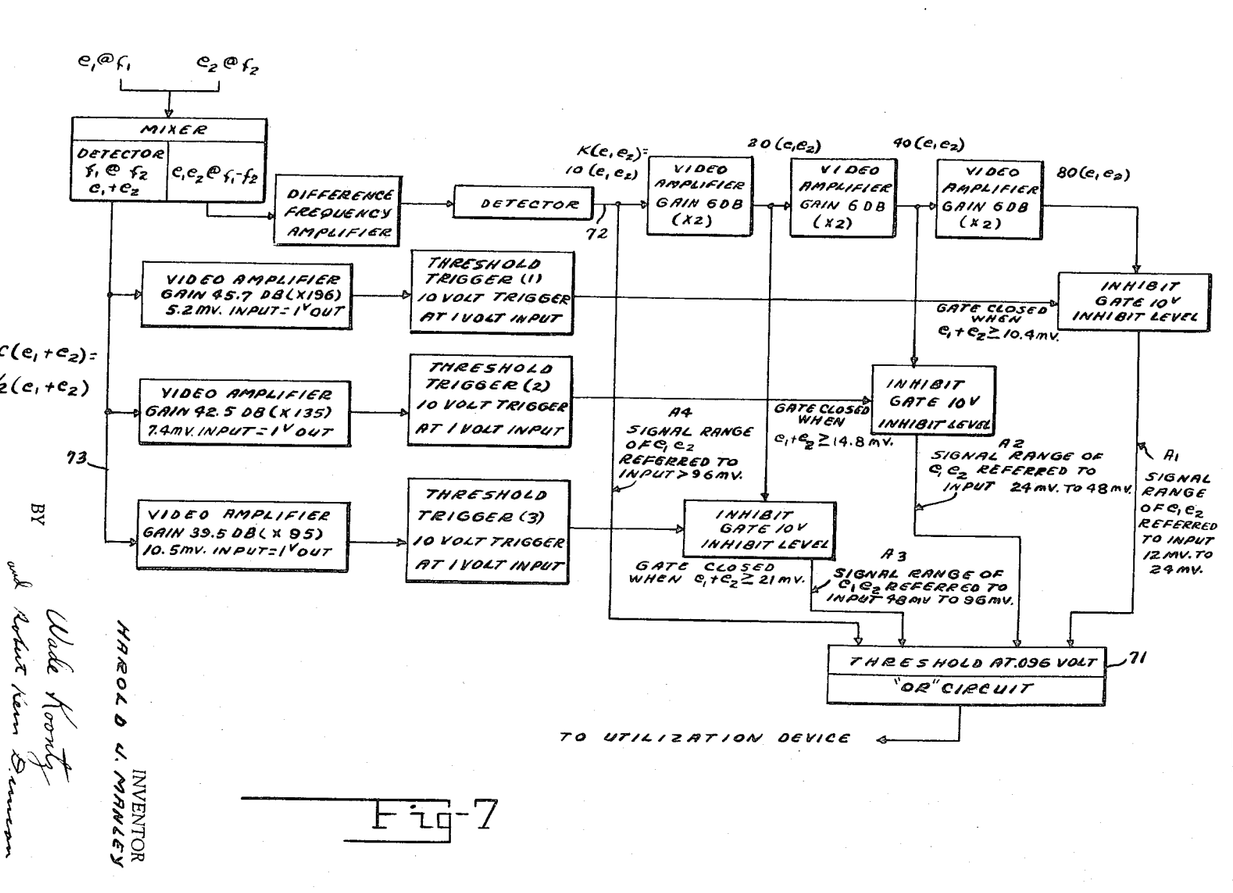
FIG. 7 is a block diagram of an embodiment of the invention with illustrative signal and control parameters detailed.
Figure 8:
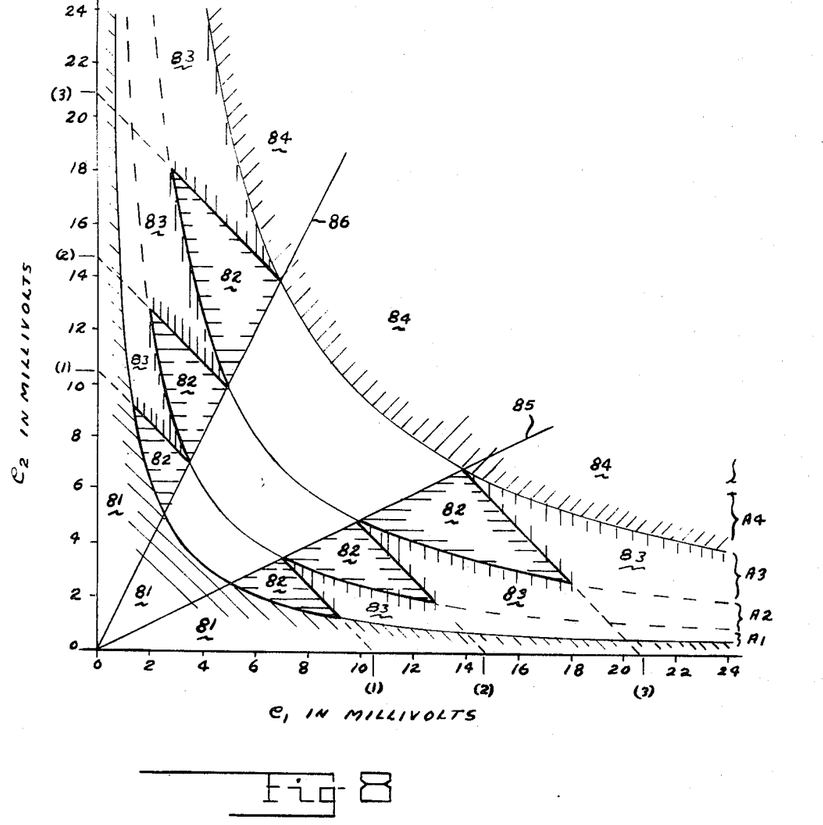
FIG. 8 is a detailed mathematical plot of the illustrative embodiment of FIG. 7.

The first of these two detailed embodiments is shown in block diagram form, with operating potentials, in FIG. 7. The detailed mathematical characteristics are set forth in FIG. 8. This embodiment differs from that shown in FIGS. 4 and 5 in that in FIG. 4 one high gain video amplifier 23 is used and the threshold selectors 24, 25 and 26 fire at different levels. In FIG. 7 the threshold triggers are all similar but each is driven by a separate amplifier having a different value of gain which establishes the proper separation in the operation of the gating circuits with respect to the received signals. In FIG. 5 the values of signal gains between the steps $A_1$, $A_2$, $A_3$ and $A_4$ are depicted as being of approximately constant voltage increment. In FIG. 7, and as graphed in FIG. 8, the values of gain of the video amplifiers in the signal channel are a constant factor of $x2$. In FIG. 7 the sum of the detected output signal appearing on line 73 is represented by $C(e_1+e_2)$ where $C$ is a factor of proportionality representing the gain (or loss) in the detector circuit, in this illustrative example $C=\frac{1}{2}$. The level of the product signal after detection in line 72 is represented as $k(e_1e_2)$ where $k$ is the representative combined gain factor of the mixer, the difference frequency amplifier, and the detector. In this embodiment for illustrative purposes it is shown as the factor 10. The optimum maximum ratio of the two signal amplitudes was in this embodiment arbitrarily set at two to one. This is depicted mathematically by lines 85 and 86 in FIG. 8. Since only four hyperbolas of signal product gain, with three sum threshold gain control circuits are created in this embodiment, the triangular areas of undesired receptivity 82 are relatively large. Still all the undesired signals occurring in areas 83 that would otherwise be accepted are excluded. In this illustrative embodiment the dynamic range is quite restricted since it would be presumed as an illustration that the probability of any pair of signals being such that their product would position them in the areas 84 is extremely remote and the weak signal sensitivity of the system as illustrated is such that signals in the areas 81 would not be usable. Thus the dynamic range illustrated is: for the product $e_1e_2$ 12 millivolts to 96 millivolts, for the sum $e_1+e_2$ 7 millivolts to 21 millivolts, giving a possible extreme range of each signal from 1.3 millivolts to 18.3 millivolts. The system ideally excludes from recognition all pairs of signals within this dynamic range that fall outside of a two-to-one ratio, except for the areas of signal acceptance 82.

Figure 9:
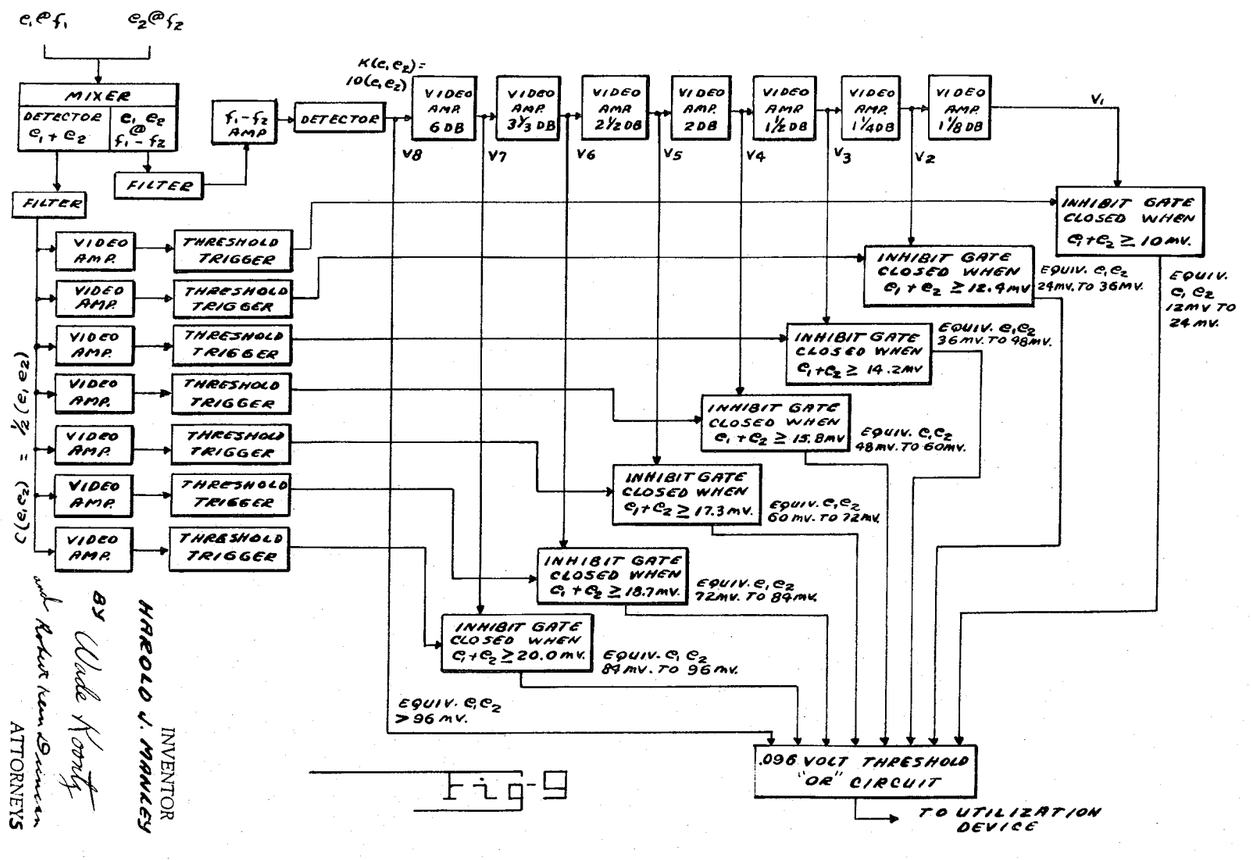
FIG. 9 is a block diagram of an embodiment of the invention having response threshold spacing at equal voltage increments.
Figure 10:
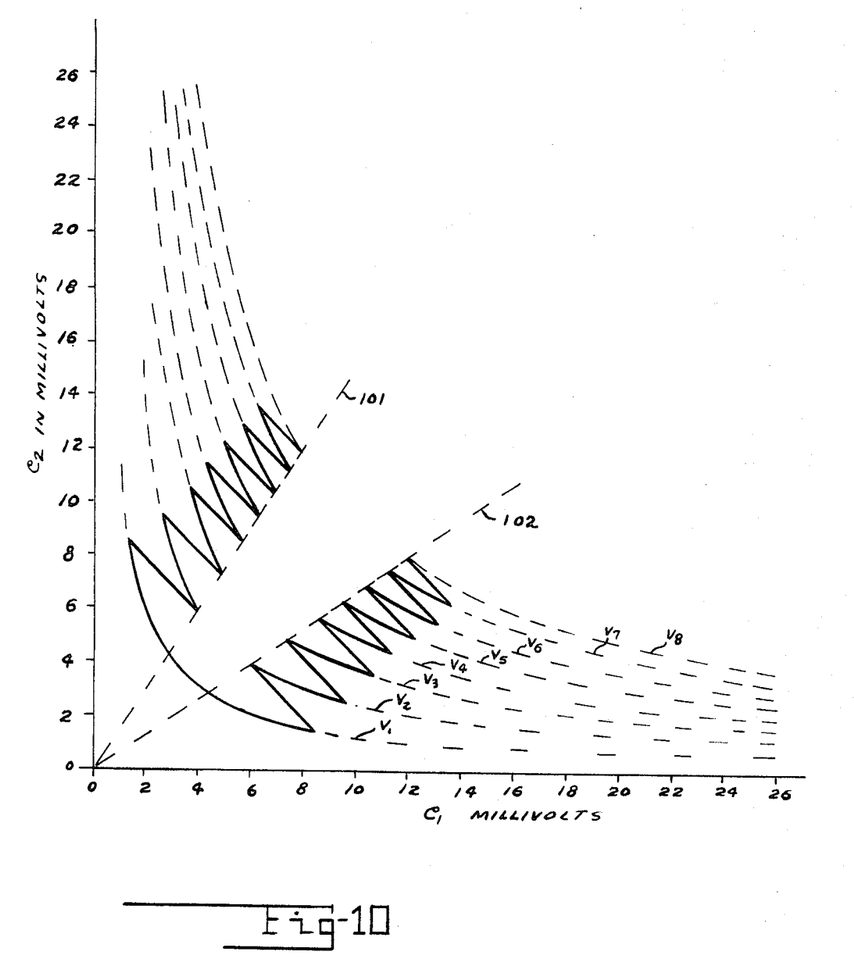
FIG. 10 is a mathematical plot of the operating characteristics of the illustrative embodiment of FIG. 9.

The embodiment illustrated in FIG. 9 with response characteristics shown graphically in FIG. 10 is illustrative of a slightly more complex system. It has a dynamic range of input signals similar to the system illustrated in FIGS. 7 and 8. The maximum ratio of signal quotients as represented by lines 101 and 102 is made 1½ to 1. The gains of the video amplifiers in the signal channel are made such that a constant increment of voltage amplification occurs between $v_1$ and $v_2$, $v_2$ and $v_3$, etc.; in this illustration 12 millivolts. With the additional stages of control it is readily apparent that the areas contained in the triangular shaped figures, representing areas of signal reception that depart from the ideal, has been greatly reduced.

An improved multifrequency pulse receiver has been disclosed. Structure has been delineated that will function in such a manner as to place a limited restriction on the ratio $e_2/e_1$ of the two signals constituting a signal pair that would otherwise be an acceptable signal to the receiver. This greatly reduces the number of spurious signals that would be received and erroneously indicated as desirable signals. The discontinuous feed forward automatic gain control herein disclosed operates in real time. Thus, it will essentially instantaneously adjust the gain of the receiver system upon the receipt of each pulse so that the receiver will only provide an output to pairs of signals whose ratio of amplitudes one to the other falls within the designed specified limits.

It will be understood that various changes and modifications may be made in the operating parameters herein disclosed without departing from the spirit and scope of the invention as set forth in the appended claims.

I claim:

1. The improvement in a multifrequency pulse receiver having a signal proportional to the product of the individual signal levels of a received signal pair during the time of signal coincidence, and another signal proportional to the sum of the individual signal levels of said signal pair during the time of coincidence, said improvement comprising: means for variably amplifying the product signal; means responsive to the sum signal cooperating with the variable amplifying means for varying the amplification of the said product signal in inverse proportion to the level of the said sum signal; threshold means responsive to the amplified product signal providing an output when said amplified product signal exceeds a predetermined value of signal threshold.

2. In an electronic system, for providing an indication that the amplitude ratio of two input signals, taken in either order, is essentially less than a specified magnitude, the combination comprising: means for receiving said input signals and providing a product signal proportional to the product of said input signals and a sum signal proportional to the sum of said input signals; level shifting means cooperating with said product signal providing a plurality of discrete levels of said product signal; independent gating means for independently gating each level of said plurality of output levels of said product signal; means cooperating with said sum signal for activating said independent gating means responsive to the level of said sum signal; threshold means cooperating with the output of said gating means for passing said gated product signals that exceed a predetermined threshold level; and indicating means responsive to output of said threshold means indicating presence of passed product signal.

3. In a multifrequency pulse receiver for receiving paired coincident signals and having a video signal proportional to the instantaneous product of the amplitudes of the signals of a received signal pair, the improvement in selectivity by restricting the responsiveness of said receiver to signal pairs having a predetermined range of the ratio of the power levels of the signals of the signal pair, said improvement comprising: detecting means cooperating with said receiver providing a video signal proportional to the instantaneous sum of the signals of the said received signal pair; means for providing a plurality of signal levels of said product video signal; a plurality of trigger actuated inhibit gates cooperating with said plurality of signal levels of said product video signal; a plurality of trigger generators responsive to and firing at predetermined levels of the said sum signal cooperating with said plurality of inhibit gates whereby the gain applied to said product signal gated through said inhibit gates is a function of the level of the said sum signal; signal collecting means having a threshold level cooperating with said inhibit gates and said plurality of levels of product signal providing an output responsive to said product signals exceeding said threshold level.

4. In a signal pair selection device having a signal indicating device and having a signal proportional to the product of the coincident amplitudes of the signals of a signal pair and having another signal proportional to the sum of the coincident signal amplitudes of the said signal pair, the improvement comprising: means for providing at least two levels of signal of the said product signal; product signal gating means for individually gating said levels of the product signal; control means responsive to said sum signal controlling said gating means whereby said levels of product signal are passed by said gating means in responsive to the amplitude of said sum signal; an OR circuit having a predetermined threshold level for passing signals exceeding said threshold to said signal indicating device; and connecting means cooperating with said gating means and with said OR circuit, conducting said levels of product signal passed by said gating means to the OR circuit.

5. In a signal pair selection device having a signal proportional to the product of the energies of a signal pair and another signal proportional to the sum of the energies of said signal pair, the system improvement comprising: amplifying means for providing a plurality of amplifications of the product signal; selecting means cooperating with the sum signal for selecting the amplification of said product signal from the said amplifying means; and threshold means cooperating with said amplifying means having a signal output when said amplified product signal is greater than the threshold of said threshold means.

6. In a signal pair selection device having a signal proportional to the product of the signal amplitudes of a signal pair and another signal proportional to the sum of the signal amplitudes of said signal pair, the system improvement comprising: amplifying means for providing discrete amounts of gain of product signal; selecting means responsive to the sum signal for selecting the amount of gain of the said amplifying means in inverse proportion to the amplitude of said sum signal; threshold means cooperating with the said amplifying means for passing the amplified product signal when it exceeds a predetermined value of signal amplitude.

7. A discontinuous feed forward automatic gain control system for multifrequency pulse receivers having an output to a signal sensing device, a detected difference frequency video signal proportional to the product of the amplitudes of the received signals that constitute a signal pair input, and a signal proportional to the sum of the detected signals of the signal pair, the gain control system comprising: means for providing a plurality of ranges of signal levels of said product signal; gating means operatively associated with each range of said plurality of ranges of product signal level; triggering means responsive to the level of said sum signal for triggering said gating means; signal collecting means for receiving signals gated through said gating means; threshold means cooperating with said signal collecting means whereby only said product signals passed by said gating means that exceed said threshold are passed to the said output of the multifrequency pulse receiver.

8. A discontinuous feed forward automatic gain control system for multifrequency pulse receivers having a signal indicating means, a difference frequency signal equal to the difference in frequency between the frequencies of a received signal pair and at an amplitude equal to the product of the signal amplitudes of the signals of the said signal pair, and a detected signal proportional to the sum of the amplitude of the signals of the said signal pair, the system comprising: means for providing a plurality of levels of said difference frequency signal; means for independently detecting each of said plurality of levels of difference frequency signal; inhibit gates cooperating with all but one of each of said plurality of detectors; trigger means for actuating said inhibit gates, said triggers having a firing threshold amplitude selectively responsive to said sum signal; an OR circuit having a predetermined threshold whereby said product signals passed by said inhibit gates that exceed said threshold are passed to said signal indicating means.

9. A multifrequency pulse receiver comprising: mixing and detecting means for receiving a signal pair and providing a difference frequency signal proportional in amplitude to the instantaneous product of the signals of the said received signal pair and a detected signal proportional to the sum of the signals of the said signal pair; means for detecting said difference frequency signal providing a video signal proportional in amplitude to the instantaneous product of the signals of said received signal pair; means for providing a plurality of levels of said video signal; inhibit gates numerically equal in number to one less than number of said plurality of levels of video signal; threshold controlled trigger means numerically equal in number to said inhibit gates, responsive to said sum signal, for actuating said inhibit gates; an OR gate having a predetermined threshold level for passing said levels of product signal that are not inhibited by said inhibit gates and that exceed said threshold; and indicating means indicating said signals passed by said OR gate.

References Cited

UNITED STATES PATENTS

| | | | |
|---|---|---|---|
| 2,866,015 | 12/1958 | Sailor | 330—133 |
| 3,005,094 | 10/1951 | Taylor | 325—410 |
| 3,036,211 | 5/1962 | Broadhead | 325—410 |
| 3,042,800 | 7/1962 | Gluth | 325—322 |
| 3,103,009 | 9/1963 | Baker | 325—474 |
| 3,214,700 | 10/1965 | Hook | 325—323 |

RODNEY D. BENNETT, Jr., *Primary Examiner.*

D. C. KAUFMAN, *Assistant Examiner.*

U.S. Cl. X.R.

325—402; 328—116, 157